Fig. 2.

Patented Aug. 9, 1932

1,871,174

UNITED STATES PATENT OFFICE

EUGENE J. GRUENEWALD, OF LAFAYETTE, INDIANA, ASSIGNOR TO ROSS GEAR & TOOL COMPANY, OF LAFAYETTE, INDIANA, A CORPORATION OF INDIANA

MACHINE FOR CUTTING SPIRALLY GROOVED CAMS

Application filed June 23, 1931. Serial No. 546,321.

The object of this invention is to provide a novel machine for cutting spirally grooved cams or "actuating members" such, for example, as are employed in the so-called Ross cam and lever steering gears such as shown in Ross Patent No. 1,567,997 dated December 29, 1925.

The present invention provides a machine in which the blanks to be cut can be readily positioned on a horizontally disposed work table beneath a vertically disposed rotatable cutter which operates upon the cam to cut the groove therein. During the cutting operation the table is given an arcuate movement which is controlled by a reciprocable master cam, which is shaped to cause the table to move on through its arcuate path at any desired rate of speed during the cutting operation so as to produce in the cam a groove which may be varied in pitch as may be desired. In cams for the Ross gears the groove varies in pitch from center toward each end thereof and also varies in depth.

The machine forming the subject matter of the present invention comprises (1) a horizontal work table upon which the blank is mounted and rotated at a constant speed during which time the said table has (constant or intermittently variable) arcuate travel beneath, and in respect to a longitudinally and transversely immovable, rotating cutter; and (2) a vertical rotatable spindle carrying a milling cutter and mechanism for operating same, the said vertical head being longitudinally and transversely immovable, but vertically variable with respect to the table. These two mechanisms are built on a common main frame or base and are interconnected by a common main drive, to which power is applied at a constant rate of speed; the speed of the cutter spindle being considered as constant during the cutting operation; but the speed at which the blank is rotated during the cutting operation may be accelerated or retarded by the use of change gearing; also the speed at which the work table makes its arcuate travel being under the control of a master cam may be constant or be variable as required.

To enable others to clearly understand and use the invention the same will be described in connection with the accompanying drawings forming part of this specification and in said drawings.

The machine shown comprises a base 1 on which is fixed a bed plate 1a, upon which is slidably mounted a movable table 2 which carries the mechanism for supporting and rotating the blank to be cut. Upon this bed 1a is also mounted a standard 1b, which is preferably arched for strength, and on this standard above the bed is mounted a housing 1c in which are mounted the main driving shaft and gearing by which motion is transmitted from said shaft to the work table actuating gears, and to the cutter carrying spindle, which is guided in a sleeve mounted in vertically disposed casing 1d on the frame below the housing.

On the table 2 is mounted a head stock 3 and a tail stock 3x, these being axially aligned, the tail stock having a slidable spindle 3y which can be moved in or out to engage or disengage the slot in the end of the cam blank B by means of a hand lever 3z pivoted on the table and operable in the usual manner. The head stock 3 has a spindle $3a$ rotatably mounted therein and a blank B to be cut into a cam is supported by and between the adjacent ends of the spindles $3a$ and $3y$ (see Figs. 1 and 2).

Figure 1:
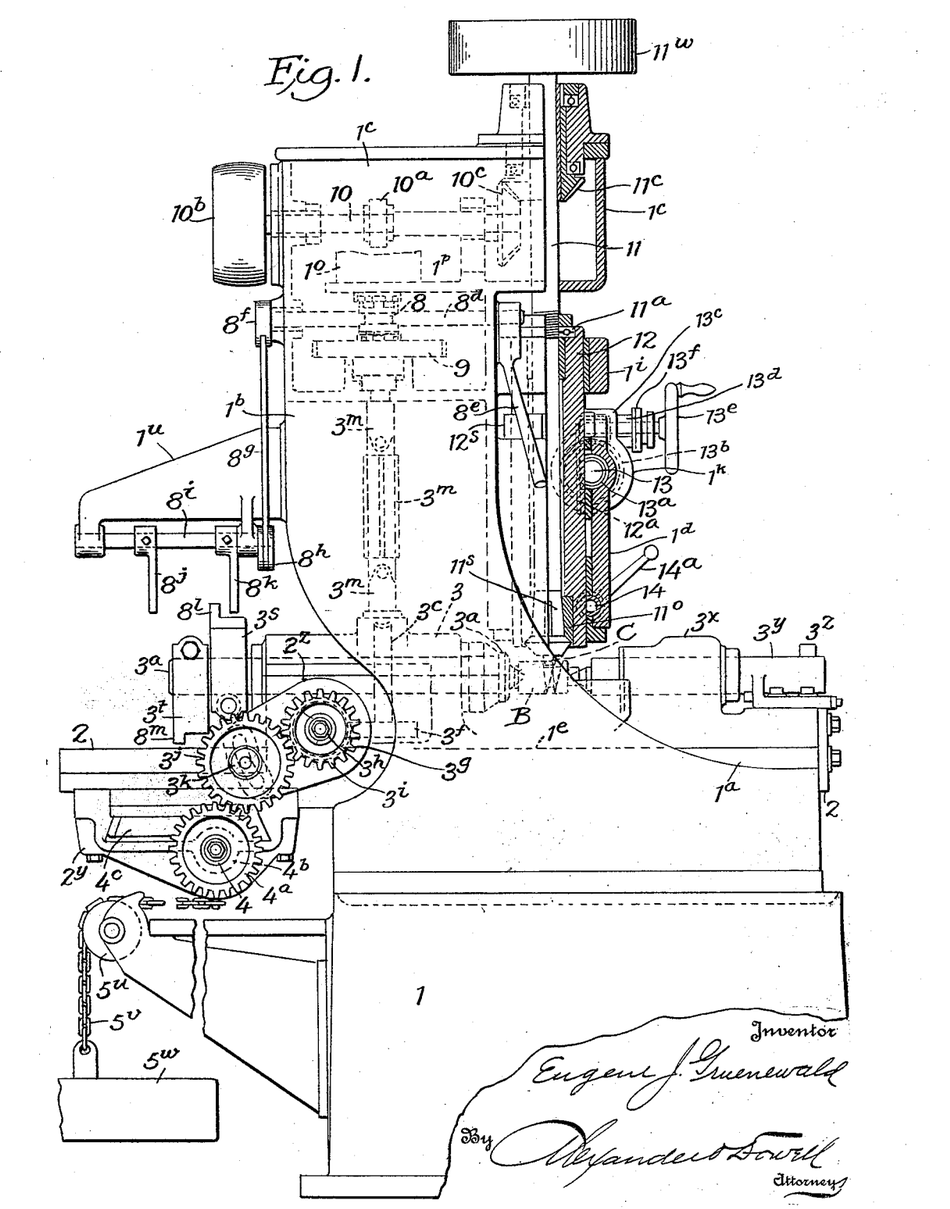
Figure 1 is an elevation of the complete machine looking on the master cam change gears and also showing a half section of the vertical head taken along the center line of the cutter spindle.
Figure 2:
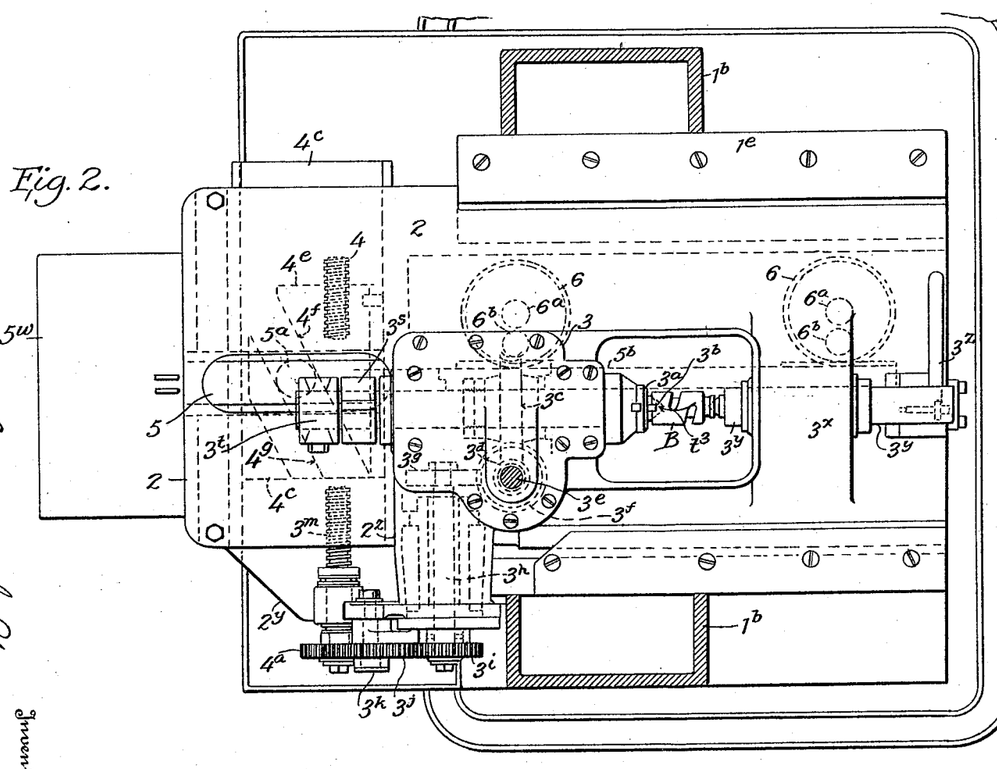
Figure 2 is plan of the work table with the frame in section level with the work spindle center line.
Figure 3:
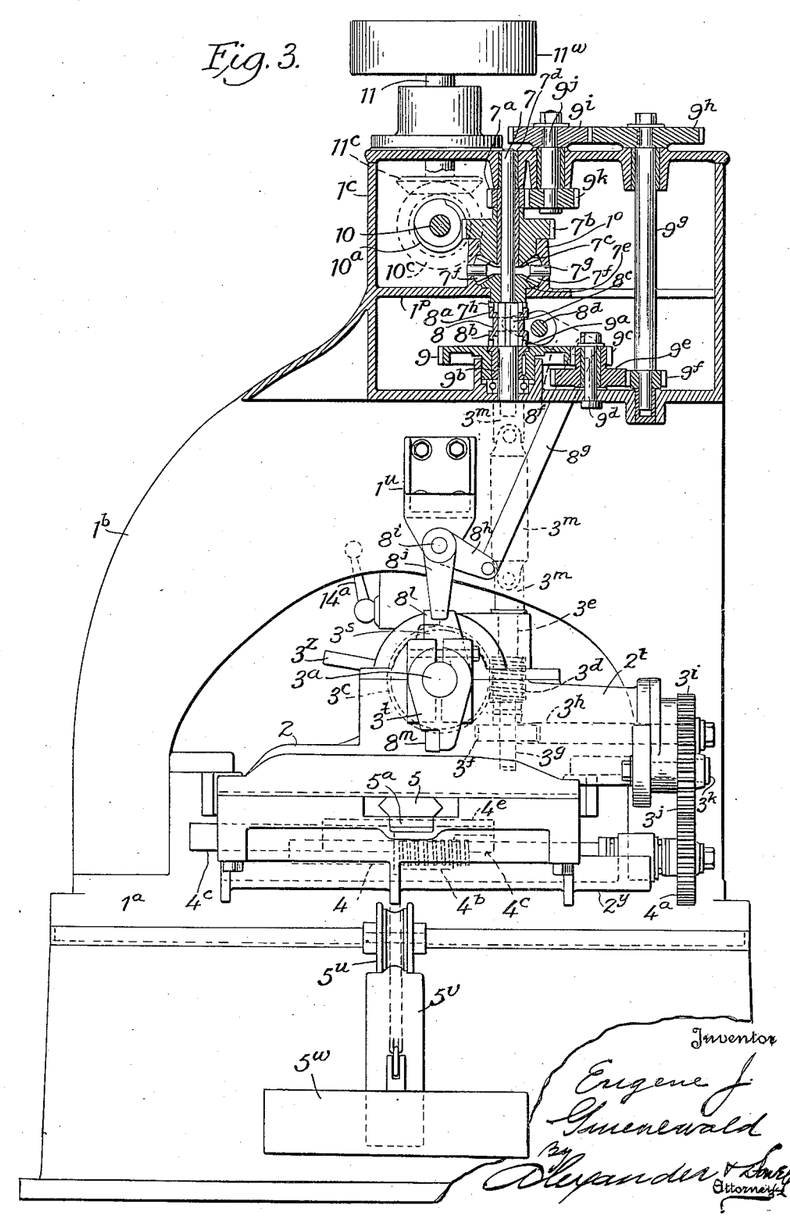
Figure 3 is an elevation of the complete machine looking from the rear, and showing a part section through the frame along the center line of the vertical feed drive shaft.

On the spindle $3a$ is keyed a worm wheel $3c$ which is preferably housed within the head stock 3 and this wheel $3c$ meshes with a worm $3d$ on a vertical stub shaft $3e$ journaled in bearings in the side of the head stock 3 (see Figs. 1, 2 and 3). Shaft $3e$ is driven as hereinafter described. On the lower end of shaft $3e$ is mounted a helical gear $3f$ which meshes with a helical gear $3g$ on a counter shaft $3h$ journaled in bearings in a casting $2z$ on table 2 adjacent head stock 3. The shaft $3h$ carries a pinion $3i$ meshing with an intermediate pinion $3j$ mounted on a stud $3k$. Pinion $3j$ also meshes with a pinion $4a$ on a lead screw shaft 4 which is journaled in bearings in a casting $2y$ attached to the underside and outer end of the table 2 (see Figs. 2 and 3).

The lead screw 4 is axially immovable but is rotatable in its bearings in the casting $2y$ and engages a nut $4b$ on a slide $4c$ which is guided in a groove in the casting $2y$ in which groove the slide $4c$ can be moved back and forth transversely with respect to the longitudinal center of the table 2, the movable slide being dependent on the rotation of the lead screw 4. On the upper side of the slide $4c$ is securely fastened a master cam $4e$ (see Fig. 2), said cam having an outer inclined cam surface or edge $4f$ which engages a roller $5a$ on the underside of a slide 5 which is arranged beneath and longitudinally of the table 2 and may be guided in a slot in the upper side of casting $2y$ (see Figs. 2 and 3). To the slide 5 is connected a rack bar $5b$ which extends longitudinally of and beneath the table 2 and the rack meshes with two link gears 6 which are spaced at a convenient distance apart and located between the bed plate $1a$ and the table 2; being preferably disposed in a longitudinal groove in the underside of table 2.

The peripheries of the link gears have no contact with the sides of the aforementioned groove but a means of adjustment to maintain a proper sliding fit for the rack is provided by a gib $2v$, this adjustment being made after link gears 6 are in their correct positions. Each link gear 6 has two studs $6a$ and $6b$, integral or inserted as desired. One stud $6a$ (Fig. 4) is located on the radial center of the pitch diameter of the gear, and the other stud $6b$ (Fig. 4) is located at a distance from this radial center equal to the radius of the arc on the cam it is desired to produce. The complete link gear assembled has then the appearance of a crank with spur gear teeth at the periphery of a circular disc.

The underside of the table 2 has a longitudinal dovetail groove in it, situated above that in which the link gears and rack are located, and secured in this groove is a pivot plate $6e$ (Fig. 4) in which are arranged two bearings $6i$ with which the studs $6a$ of the link gears are engaged. In the upper surface of the bed $1a$ is a groove in which is a link plate $6f$ (Fig. 4) held between the gibs $1s$. In this said link plate are two bearings $6g$ with which the stud $6b$, previously mentioned are engaged. These bearings are accurately spaced and are so located with respect to the common longitudinal center line of both pivot and link plates as is required by the relation of the center of the required arc (to be described by the milling cutter C) to the longitudinal center line of the steering gear cam blank B, as will be seen in Fig. 2 (see Figs. 1 and 2).

To take up any lost motion in the linkage and to maintain contact between the roller $5a$ and master cam $4f$ when the cutter is engaged springs or weights may be employed; preferably a weight $5w$ is suspended by a chain $5v$ running over a pulley $5u$ mounted on the base and connected to the adjacent end of the carriage $2y$, (see Fig. 1). During the cutting operation as the table is moved the weight is raised.

If desired a reverse cam $4g$ may be mounted on the slide $4c$ opposite the cam $4e$ to keep the roller $5a$ positioned, but it is not necessary to have the cam $4g$ conform to the profile of the edge $4f$ of the master cam, as the reverse cam only functions at the end of an operation and during the return of the table 2 to its original starting position.

The shaft $3e$ is connected by a flexible universally jointed shaft sections $3m$ with the lower end of a vertically disposed shaft 7 in the housing $1c$ above the table 2. This shaft 7 is driven as hereinafter described and controls the speed and direction of rotation of the shaft $3e$, the shaft sections $3m$ permitting the arcuate movement of the work table with respect to the laterally immovable shaft 7, as hereinafter described.

The shaft 7 is rotatable in fixed bearings in the top and base of the housing $1c$ and upon this shaft near the upper end thereof is rotatably mounted a pinion $7a$, a gear $7b$ and a beveled gear $7c$. These may be formed integral or fixed so as to rotate as a unit and preferably a bushing $7d$ is interposed between these gears and the shaft 7. On the shaft 7 below bevel gear $7c$ is a similar bevel gear $7e$ loose upon the shaft, but interposed between the bevel gears $7c$ and $7e$ are pinions $7f$ meshing with both bevel gears $7c$ and $7e$, the pinions $7f$ being rotatable upon studs $7g$ mounted in a bearing $1o$ supported on a bracket $1p$ in housing $1c$. The pinions $7f$ cause the gears $7c$ and $7e$ to rotate in opposite direction around the vertical shaft 7. The bevel gear $7e$ has a clutch face $7h$ on its lower side adapted to engage opposed clutch face $8a$ on a double clutch member 8 which is slidably mounted on and keyed to shaft 7, when clutch 8 is engaged with gear 7e rotation is imparted from gear 7e to shaft 7.

Rotatably mounted on shaft 7 below the clutch 8 is a gear 9 of larger diameter than gear 7b, and provided with a clutch face 9a which is adapted to be engaged with an opposed clutch face 8b on the lower side of clutch 8. The gears 7e and 9 are so spaced apart that when the clutch 8 is disposed exactly intermediate these gears it will not be engaged with either gear 7e or 9, but by raising clutch 8 it can be engaged with gear 7e, and by lowering clutch 8 it can be engaged with gear 9.

The clutch faces 9a may be formed on gear 9 or on a bushing 9b splined in the hub of the gear as shown in Fig. 3. Gear 9 meshes with a small pinion 9c on a stud 9d on the lower part of the housing 1c and pinion 9c is formed with or rigidly connected to the hub of a larger gear 9e which in turn meshes with a pinion 9f on a vertical shaft 9g journaled in the housing 1c parallel with shaft 7 and on the upper end of shaft 9g is a gear 9h which meshes with a smaller gear 9i on a stud shaft 9j journaled in the top of the housing 1c, and on the lower end of the stud 9j is a gear 9k which meshes with the small pinion 7a loosely mounted on shaft 7 as above described.

The gears 9i, 9h may be movable and changeable so that by changing these gears the relative speed of the forward and reverse movements of shaft 7 can be varied.

The gears 7b is shown as a worm gear and meshes with a worm 10a on a horizontal drive shaft 10 disposed in bearings in the housings 1c, at right angles to one side of the shaft 7. This shaft 10 is shown as provided with a pulley 10b which may be belted to any suitable driver.

The clutch 8 is normally held in intermediate position but may be raised or lowered at will. As shown it has a groove engaged by a yoke 8c on a shaft 8d journaled in the housing 1c parallel with the shaft 10, but at the opposite side of the shaft 7, the shaft 8d may be operated by a hand lever 8e (Figs. 1 and 4), and is also automatically operated upon the movement of the table 2 to either extreme limit. For this purpose an arm 8f on the shaft 8d (see Fig. 1) is connected by a link 8g to an arm 8h on a rock shaft 8i journaled in a bracket 1u attached to the standard 1b (Figs. 1 and 2) and on shaft 8i are fixed two depending trip fingers 8j and 8k which are respectively adapted to be engaged by lugs 8l and 8m respectively on arms 3t and 3s fixed on the outer end of the spindle 3a (see Figs. 1 and 3).

As the table 2 nears the extreme limit of its inward movement (to the right in Fig. 1) the lug 8l engages the finger 8k and causes the clutch 8b to disengage gear 9. As the table reaches the extreme limit of its outward movement (to the left in Fig. 1) lug 8m will engage trip finger 8j and cause clutch 8a to disengage gear 7e. Thus the table 2 will be automatically disconnected from the driving shaft 7 at the end of the limit of movement of the table to right or left.

Figure 4:
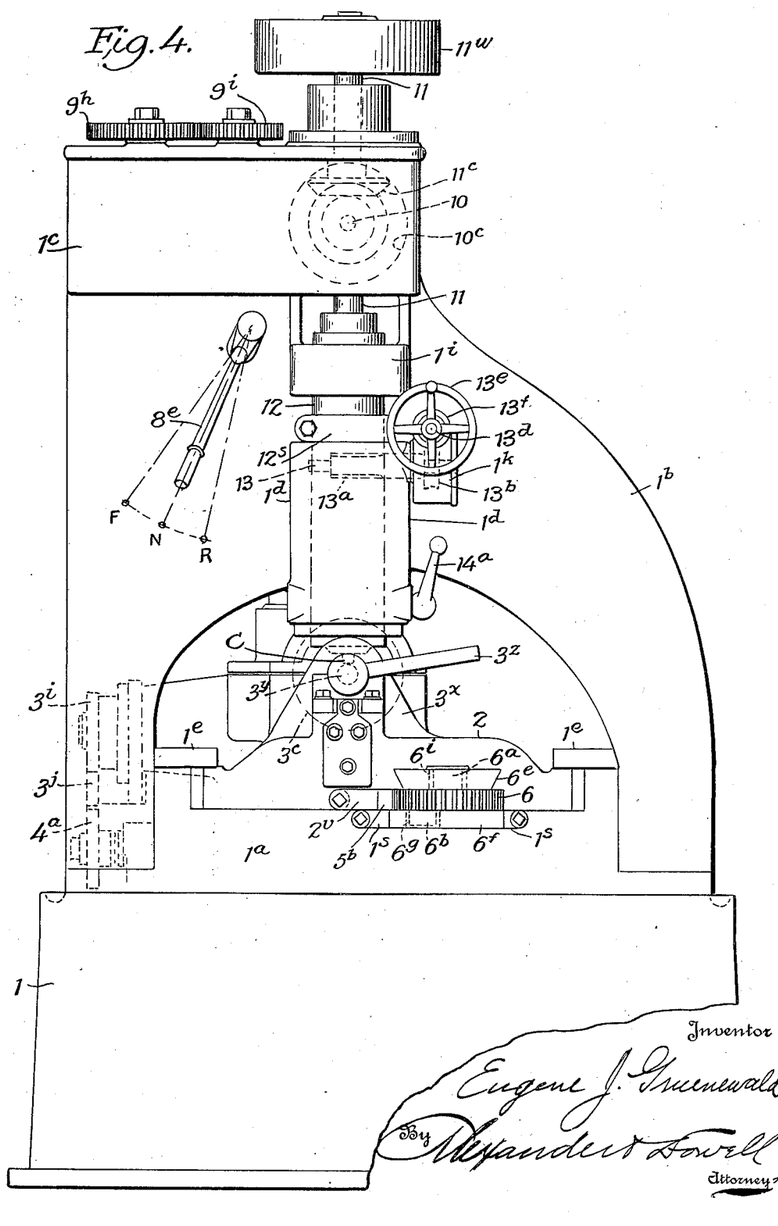
Figure 4 is an elevation of the complete machine looking from the front or operator's station.

On drive shaft 10 is a bevel gear 10c which meshes with a bevel gear 11c slidably keyed on the cutter spindle 11, which is rotatably journaled in bearings 11a and 11b in the upper and lower ends of a vertically adjustable sleeve 12, which is slidably guided in an upper bracket 1i and a lower bracket or head 1d attached to the side of the standard 1b (see Figs. 1 and 4).

The spindle 11 is provided at its extreme lower end with a milling cutter C. Any suitable means (indicated at 11s) for detachably attaching the milling cutter to the spindle may be used.

Figures 7, 8:
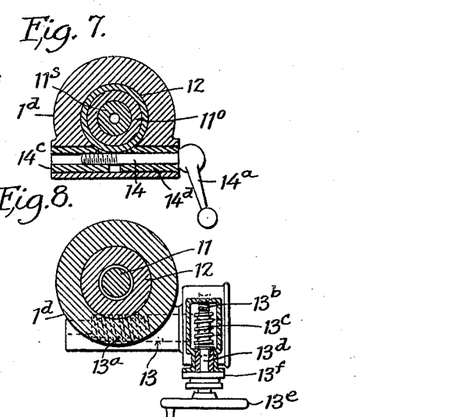
Fig. 7 is a detail sectional view of a spindle clamp.
Fig. 8 is a detail sectional view of the devices for vertically adjusting the spindle support.

The sleeve 12 is provided with a rack 12a on its front face which engages a small pinion 13a on a shaft 13 journaled in suitable bearings in the bracket 1d. On the outer end of the shaft 13 is a worm gear 13b which meshes with a worm 13c on a stub shaft 13d journaled in a housing 1k attached to the bracket 1d and operable by a hand wheel 13e (see Figs. 1, 4 and 8). The sleeve 12 and spindle 11 can be manually raised and lowered by turning the hand wheel 13e, and by said devices the cutter can be accurately, minutely, vertically adjusted; and its adjustment can be determined by means of a suitably graduated dial 13f attached to the housing 1k.

The sleeve 12 may be provided with a stop 12s (Fig. 4) which may be clamped thereto intermediate the brackets 1d and 1i. After the sleeve and cutter are adjusted to proper lowermost position by means of the worm gearing above described, the stop 12s should be adjusted into contact with the top of the bracket 1d and then firmly clamped to the sleeve. Thereafter the sleeve with the spindle and cutter can be quickly raised when desired without having to back up or disturb the adjustment of the worm gearing 13a, 13b, 13c; and can be quickly restored and arrested in correct operative position by the stop 12s. When in proper position the lower end of the sleeve 12 can be held fixedly in the lower end of the bracket 1d by means of clamps 14c and 14d connected by a screw operable by a handle 14a (see Figs. 1, 4 and 7). The spindle 11 carries a flywheel to eliminate vibration; a flywheel 11w being shown on the upper end of the spindle.

*Operation*

The blanks B to be grooved should be approximately cylindrical and provided at one end with an axial recess to engage the tapered end of the tailstock spindle 3y, and at its other end with a similar recess to engage the tapered end of the headstock spindle 3a, and in addition this end of the blank should be provided with an offset slot to engage a key 3b (Fig. 2) on the end of the spindle 3a, so that when the blank is positioned between the spindles 3a and 3y as shown it can be rotated by and with the spindle 3a. The slot and key 3b provide a simple and effective manner of rotating the blank with the spindle 3a, but other means for rotatably engaging the blank with the spindle could be used if desired.

In Fig. 2 the table 2 is shown at about mid-position of its movement, but at the beginning of a blank cutting operation the bed should be moved fully to the left so that the roller 5a would be opposite the smaller end of the cam 4e. During the cutting operation the slide 4c is moved toward the gear 4a, and the table 2 is moved toward the right (Fig. 2), but also has a lateral arcuate movement imparted thereto by the action of the link gears 6.

When the table 2 is at the extreme end of its outward movement, and before starting an operation, the clutch 8 would be disengaged from both gears 7e and 9, and the controlling lever 8e would be in neutral position, (marked "N") as indicated in Fig. 4, and the inner end of the tailstock be adjacent the cutter spindle. While in this position, a blank B is inserted between the spindles 3a and 3y, while the latter is retracted and the slotted end of the blank engaged with the key 3b, and then the spindle 3y engaged with the other end of the blank so as to support the same between the spindles as indicated in Figs. 1 and 2. After the blank is positioned the sleeve and spindle are lowered to enter the cutter C into a radial hole previously formed in the blank, and as soon as the machine is started the cutter is rotated by the gearing between the spindle and the shaft 10 above described.

The starting lever 8e is then moved over to the left or the "forward" position, "F" (see Fig. 4) which causes clutch 8 to engage gear 9 and thereupon rotation is imparted from the drive shaft 10 through the gears 7b, 7a, 9k, 9i, 9h, shaft 9g, gears 9f, 9e, 9c and 9 and clutch 8 to the shaft 7; and thence through the universal joints 3m to the shaft 3e of the table drive assembly. From shaft 3 a slow rotary motion is imparted to the blank through gears 3d, 3c and headstock spindle 3a; and also slow motion is simultaneously imparted to slide 4c through the train of gears 3f, 3g, 3i, 3j, 4a, and lead screw 4, and as slide 4c moves to the right (Fig. 3) cam 4e engaging roller 5a moves the slide 5 and rack bar 5b to the left (Fig. 2) and actuates link gears 6 which through the stud 6a, 6b cause the table 2 to move on an arc and carry the blank through a similar arc (indicated by the arrow Z3, Fig. 2) with respect to the cutter C which rotates on a fixed center. The link gears 6 are so designed that the arc Z3 has a radius equal to the distance between the centers of the adjacent studs 6a and 6b.

The speed of rotation of blank B is so regulated with regard to the arcuate movement of the table and blank beneath the cutter that during the cutting operation a spiral groove is cut in the blank from one end to the other. When cutting cams for the so-called Ross-cam-and-lever-steering-gears, the arcuate movement of the blank relative to the cutter is such that the spiral groove cut in the blank will vary in pitch and depth from the center toward each end thereof, but I do not consider the invention limited to such variant grooves; and by varying the relative dimensions and arrangements of the link gears and studs the arc can be made greater or less, or the arcuate movement might be deepened when it is desired to cut a straight unvarying spiral groove in the blank.

When the desired groove has been cut in the blank, the table 2 will have about completed its movement to the right (Fig. 2), and the tooth 8l on dog 3s will engage trip finger 8k and throw the clutch 8b out of engagement with the gear 9. Lever 8e can then be moved to "reverse position" "R" (see Fig. 4) which will engage clutch 8a with gear 7e which will produce a reverse rotation of the shaft 7 and consequently of the table 2 and slide 4c, through the gearing above described until the bed is returned to extreme left hand position (Fig. 2). During this reverse movement the shaft 7 is driven more rapidly through the train of gears 7b, 7c, 7f and 7e and the clutch 8. The bevel gears between the gears 7c and 7e cause a reverse rotation of the shaft 7, the gear 7b being driven only in one direction.

On the reverse movement the roller 5a engages with the reverse cam 4g instead of with the master cam 4f. As the table reaches its initial starting position, the dog 8m on spindle 3a engages trip finger 8j and through its connections disengages clutch 8a from gear 7e, the lever 8e being returned to "neutral" position.

The contour of the master cam 4e can be varied, but for making cams for steering gears the master cam should be so formed as to impart longitudinal travel to the rack 5b in the manner and time required to make the link gears 6 move the table on an arc of equal magnitude to that of the required steering gear cam, within such transverse travel of table 2 as the construction of the parts will permit. Various combinations of ratios may be produced in the master cams, and progressions may be made from each combination of ratios by varying the gears 3i, 3j and 4a.

Figure 5:
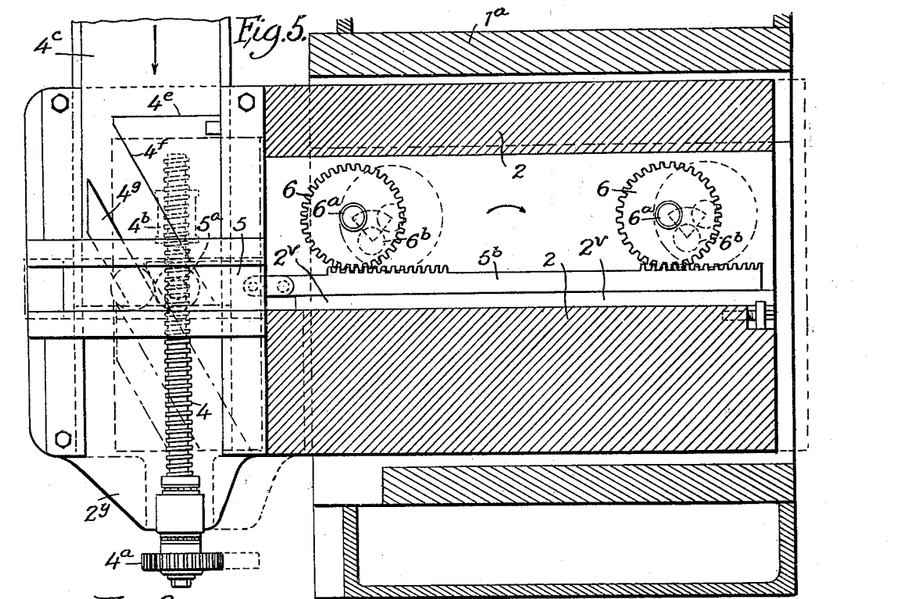
Fig. 5 is a horizontal section through the table taken just above the plane of the link gears 6 showing in full lines the position of parts at the beginning of an operation and in dotted lines in the position assumed at the end of an operation.
Figure 6:
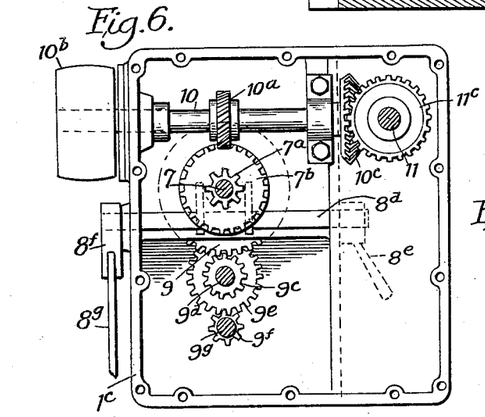
Fig. 6 is a detail top plan of parts in the housing 1c the cover being removed.

In Figs. 1 to 4 the cutter spindle is shown locked at the desired depth and with the cutter operating at the center of the blank; the table is shown at its intermediate position but with the starting lever and clutch at neutral consequently the feed is disengaged. In Fig. 5 the work table is shown in section, in a plane level with the top of the link gears; and the link gears, rack, master cam and slide are shown in full lines in the relative positions at the commencement of operative stroke of the bed; and said parts are indicated by the dotted lines in the relative positions at the end of such stroke.

I claim:

1. In a machine for cutting spirally grooved cams or the like, a table for supporting the blank to be cut, means for rotating the blank during the cutting operation, means controlled by a reciprocable master cam for moving the table in an arcuate path during the cutting operation, the means for moving the table in an arcuate path comprising spaced link gears having studs engaged with the table and a relatively fixed member, and a rack mounted on the table and engaging said link gears.

2. In a machine for cutting spirally grooved cams or the like, a table for supporting the blank to be cut, means for rotating the blank during the cutting operation, means controlled by a reciprocable master cam for moving the table in an arcuate path during the cutting operation, a reciprocable slide carrying the master cam, a lead screw for operating the slide, and reducing gearing for operating the lead screw.

3. In a machine as set forth in claim 2, the means for moving the table in an arcuate path comprising spaced link gears having studs engaged with the table and a relatively fixed member, and a rack mounted on the table and engaging said link gears.

4. In a machine for cutting spirally grooved cams or the like, a table for supporting the blank to be cut, means for rotating the blank during the cutting operation, and means for moving the table in an arcuate path during the cutting operation; a shaft disposed above the bed, a connection between said shaft and the bed driving and blank rotating mechanisms, a slow train of gears and a fast train of gears for driving the shaft in opposite directions, and means whereby either train may be operatively engaged with or disengaged from the said shaft.

5. In combination with the mechanism as set forth in claim 4, trip mechanism substantially as shown and described whereby the trains of gears are automatically disengaged from said shaft at the end of each stroke of the table.

6. In a machine for cutting spirally grooved cams or the like, a table for supporting the blank to be cut, means for rotating the blank during the cutting operation, and means controlled by a reciprocable master cam for moving the table in an arcuate path during the cutting operation; a shaft disposed above the bed, a connection between said shaft and the bed driving and blank rotating mechanisms, a gear rotatable in one direction mounted on said shaft, a slow train of gears and a fast train of gears driven from said rotatable gear, and clutch mechanism whereby the fast train or the slow train may be operatively engaged with the said shaft to actuate the same.

7. In combination with the mechanism as set forth in claim 6, trip mechanism substantially as shown and described whereby the trains of gears are automatically declutched from said shaft at the end of each stroke of the table.

8. In a machine for cutting spirally grooved cams or the like, a table for supporting the blank to be cut, means for rotating the blank during the cutting operation, means controlled by a reciprocable master cam for moving the table in an arcuate path during the cutting operation, a reciprocable slide carrying a master cam, a lead screw for operating the slide, and reducing gearing for operating the lead screw, a shaft disposed above the bed, a connection between said shaft and the bed driving and blank rotating mechanisms, means for driving the shaft in opposite directions during alternate strokes of the bed; and means for engaging or disengaging said driving means from said shaft.

9. In combination with mechanism as set forth in claim 8, trip mechanism whereby said driving means is automatically disengaged from said shaft at the end of each stroke of the table.

10. In a machine for cutting spirally grooved cams or the like, a table for supporting the blank to be cut, means for rotating the blank during the cutting operation, means controlled by a reciprocable master cam for moving the table in an arcuate path during the cutting operation, a reciprocable slide carrying a master cam, a lead screw for operating the slide, and reducing gearing for operating the lead screw, a shaft disposed above the bed, a connection between said shaft and the bed driving and blank rotating mechanisms, a gear rotatable in one direction mounted on said shaft, a slow train of gears and a fast train of gears driven from said rotatable gear, and clutch mechanism whereby the fast train or the slow train may be operatively engaged with the said shaft to actuate the same.

11. In combination with mechanism as set forth in claim 10, trip mechanism whereby said driving means is automatically disengaged from said shaft at the end of each stroke of the table.

12. In a machine for cutting spirally grooved cams or the like, a table for supporting the blank to be cut, means for rotating the blank during the cutting operation, and means controlled by a reciprocable master cam for moving the table in an arcuate path during the cutting operation, a cutter carrying spindle disposed above the table and carrying a cutter adapted to operate upon the blank while the latter is supported on the table, and gearing for rotating the spindle.

13. In a machine for cutting spirally grooved cams or the like, a table for supporting the blank to be cut, means for rotating the blank during the cutting operation, means controlled by a reciprocable master cam for moving the table in an arcuate path during the cutting operation, a reciprocable slide carrying a master cam, a lead screw for operating the slide, and reducing gearing for operating the lead screw, a cutter carrying spindle disposed above the table and carrying a cutter adapted to operate upon the blank while the latter is supported on the table, and gearing for rotating the spindle.

14. In a machine for cutting spirally grooved cams or the like, a table for supporting the blank to be cut, means for rotating the blank during the cutting operation, and means for moving the table in an arcuate path during the cutting operation, a shaft disposed above the bed, a connection between said shaft and the bed driving and blank rotating mechanisms, a slow train of gears and a fast train of gears, and means whereby either train may be operatively engaged with the said shaft; a spindle disposed above the table carrying a cutter adapted to operate upon the blank while the latter is supported on the table, and gearing for rotating the spindle from said shaft.

15. In a machine for cutting spirally grooved cams or the like, a table for supporting the blank to be cut, means for rotating the blank during the cutting operation, and means controlled by a reciprocable master cam for moving the table in an arcuate path during the cutting operation, a shaft disposed above the bed, a connection between said shaft and the bed driving and blank rotating mechanisms, a gear rotatable in one direction mounted on said shaft, a slow train of gears and a fast train of gears driven from said rotatable gear, and clutch mechanism whereby the fast train or the slow train may be operatively engaged with the said shaft to actuate the same, a spindle disposed above the table carrying a cutter adapted to operate upon the blank while the latter is supported on the table, and gearing for rotating the spindle from said shaft.

16. In a machine for cutting spirally grooved cams or the like, a table for supporting the blank to be cut, means for rotating the blank during the cutting operation, and means controlled by a reciprocable master cam for moving the table in an arcuate path during the cutting operation, a reciprocable slide carrying the master cam, a lead screw for operating the slide, and reducing gearing for operating the lead screw, a shaft disposed above the bed, a connection between said shaft and the bed driving and blank rotating mechanisms, a gear rotatable in one direction mounted on said shaft, a slow train of gears and a fast trian of gears driven from said rotatable gear, and clutch mechanism whereby the fast train or the slow train may be operatively engaged with the said shaft to actuate the same, a spindle disposed above the table carrying a cutter adapted to operate upon the blank while the latter is supported on the table, and gearing for rotating the spindle from said shaft.

17. In a machine for cutting spirally grooved cams or the like; a rotatable cutter, a blank holder, a table supporting the blank holder, means for rotating the blank holder during the cutting operation, a reciprocable master cam for moving the table endwise during the cutting operation, and means engaged with the table and a relatively fixed member whereby the table is caused to traverse an arcuate path as it is moved endwise during the cutting operation.

18. In a machine for cutting spirally grooved cams or the like; a rotatable cutter, a blank holder, a table for supporting the blank holder, means for rotating the blank holder during the cutting operation, means controlled by a reciprocable slide for moving the table endwise during the cutting operation, means engaged with the table and with a relatively fixed member whereby the table is caused to traverse an arcuate path as it is moved endwise during the cutting operation, a lead screw for operating the slide, gearing for operating the lead screw, a shaft disposed above the bed, a connection between said shaft and the bed driving and blank rotating mechanisms, and gearing for driving the shaft in either direction.

EUGENE J. GRUENEWALD.